Sept. 12, 1933.　　　　H. B. BARRETT　　　　1,926,022
BRAKE SHOE LINING ASSEMBLING TOOL
Filed June 13, 1931
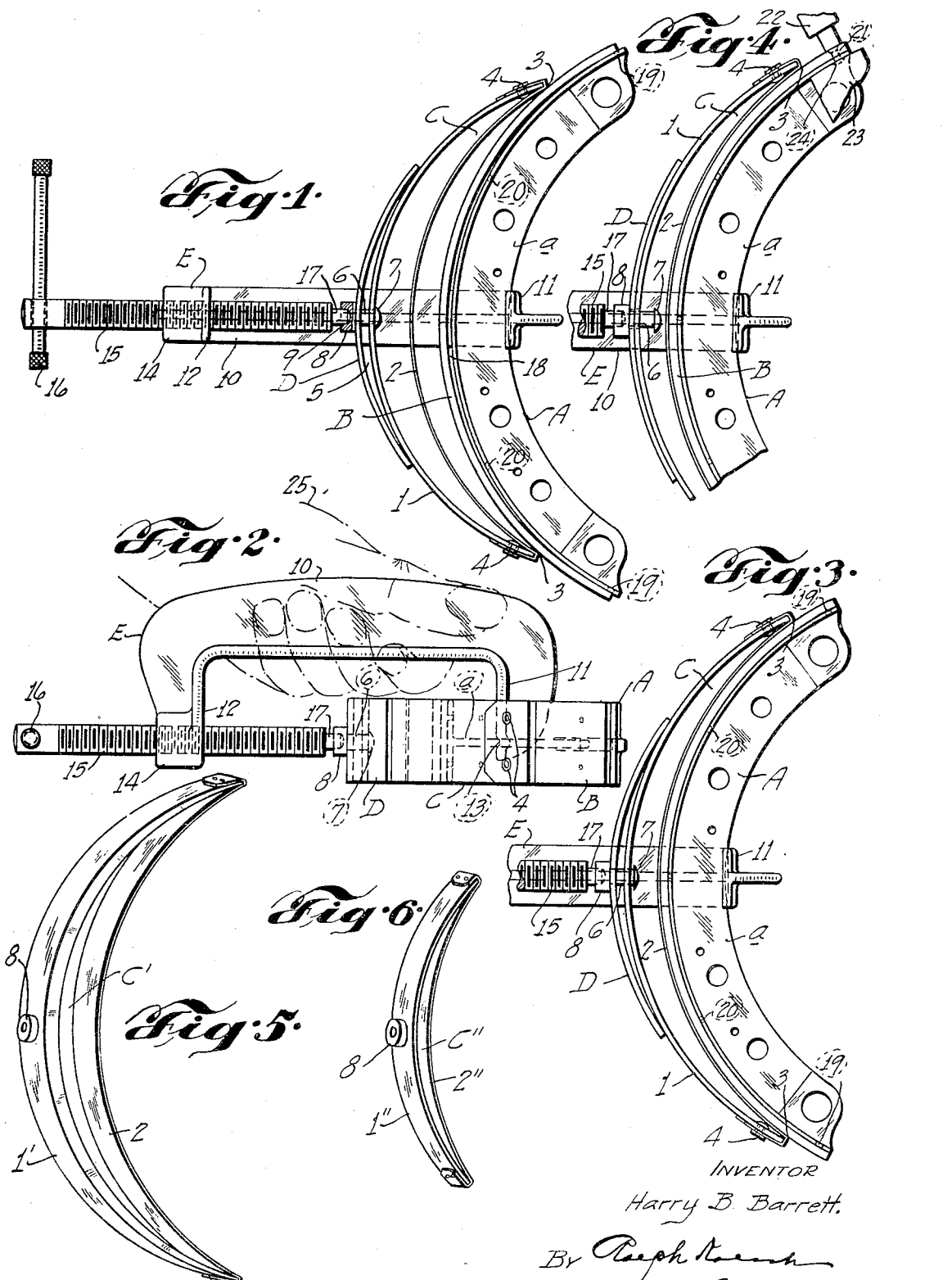
INVENTOR
Harry B. Barrett.
By Ralph Koenig
ATTORNEY Patented Sept. 12, 1933

1,926,022

UNITED STATES PATENT OFFICE 1,926,022

BRAKE SHOE LINING ASSEMBLING TOOL

Harry B. Barrett, Los Angeles, Calif.

Application June 13, 1931. Serial No. 544,113

10 Claims. (Cl. 29—84)

This invention relates generally to assembling tools and, more particularly, to a certain and useful improvement in tools or clamps especially adapted for attachably applying brake-linings to brake-shoes and the like.

In brakes in which a lining is employed, such, for instance, as automobile brakes and the like, it is requisite that the brake lining be applied firmly and evenly to the brake shoe, so that the surface of the lining be perfectly smooth and devoid of bulges and wrinkles, in order that the brake may grip evenly and effectively.

In practice, however, the proper application of brake linings on brake shoes presents many difficulties, particularly by reason of the relative stiffness of the lining, which interferes with its proper camber on the shoe. Also, very often the shoe contains irregularities in its surface or may contain projecting pieces of rivets and the like, preventing the proper seating of the lining on the face of the shoe.

My present invention has hence for its chief object the provision of an assembling tool for attachably applying brake-linings to brake-shoes, whereby the lining is, in a highly novel and effective manner, first stretched tautly on the shoe, and then, while in such stretched or taut condition, firmly and forcibly pressed or squeezed until it finds a uniformly continuous seat upon the shoe.

My invention has for another object the provision of a tool of the type stated that may with facility be mounted on the brake-shoe for attachably applying the lining thereo, the tool most conveniently then serving for handling the assembly of the tool, the shoe, and the lining to and from the drilling and riveting machines commonly employed in the brake-lining attaching art.

My invention has for still another object the provision of a tool of the character described which in use requires merely ordinary care in mounting the tool and the lining on the brake-shoe, a simple manipulation of one part of the tool then sufficing for the automatic functioning of the other parts of the tool for accomplishing the desired result.

My invention has for a further object the provision of a tool of the character set forth which is semi-automatic in operation, has merely a few simple and sturdy parts which may readily be applied to and removed from the work, is compact and readily portable, may with facility be manipulated by the workman, and is, in general, most highly efficient in the performance of its intended functions.

And with the above and other objects in view, my invention resides in the novel features of form, construction, arrangement, and combination of parts hereinafter described and pointed out in the claims.

In the accompanying drawing,

Figure 1 is a plan view of one form of tool embodying my invention, shown in connection with a brake-shoe and a lining therefor and illustrating the first step of attachably applying the lining to the shoe;

Figure 2 is an inverted side view of the tool as in Figure 1;

Figure 3 is a view of a fragmentary portion of the tool of Figure 1, illustrating the intermediate or lining-stretching stage of the attachably applying operation;

Figure 4 is a view of a fragmentary portion of the tool of Figure 1, shown in connection with fragmentary portions of a suitable riveting mechanism and illustrating both the completion of the lining-pressing stage of the operation and the method of riveting the lining to the brake-shoe;

Figure 5 is a perspective view of a modified form of the lining-stretching and pressing frame of the tool of my invention; and Figure 6 is a perspective view of another modified form of the lining-stretching and pressing frame of the tool of my invention.

Referring now more in detail and by reference characters to the drawing, which illustrate practical embodiments of my invention, A designates an arcuate brake-shoe of a type common in the automotive art, which, in the form shown, is provided with an inwardly presented flange $a$ forming a T-section, but the tool of my invention may, with equal facility, be employed on or in connection with channel-shaped and other forms of brake shoes.

B designates a section of brake-lining or friction-band, which is to be applied on and upon the periphery of the shoe A for frictional engagement with the usual drum, not shown.

The assembling tool proper comprises a lining stretching and pressing frame C, which, in turn, includes a cambered resiliently stretchable or expandable compression member or spring bar 1 adapted to span the brake-shoe A approximately throughout the greater part of its length, as best seen in Figures 1 and 3. The bar 1 is composed of spring-steel or the like, is preferably arcuate in form or contour, and its radius of curvature is less than the radius of curvature of any brake-shoe with which the tool is designed to work. The elasticity or tensional bias of the bar 1 is sufficient, however, to permit the expansion of its ends yieldingly for engagement thereof with an arcuate surface, as will presently appear.

Disposed longitudinally of the concave side of the bar 1, is a flexible strap or tension member 2 constructed of a relatively thin ribbon of steel, having its terminal portions folded over, and riveted or otherwise fixed, as at 4, to, the respective ends of the bar 1, and providing opposed lining-gripping surfaces or noses 3 for purposes presently appearing. When the bar 1 is in its unexpanded or normal state, the strap 2 is flexed arcuately inwardly of the concavity of the bar 1, as best seen in Figure 1, and preferably, though not necessarily, the strap 2 has a width corresponding to the width of the lining with which it is to be employed.

Mounted substantially centrally on the back or convex side, and adapted to span approximately half the length, of the bar 1, is a second or complementary resilient compression member or bar D likewise constructed of spring-steel or the like, also preferably arcuate in form, and having a radius of curvature less than the radius of curvature of the bar 1. Hence normally a space or gap, as at 5, exists between, and at the centers of, the bars 1 and D, as best seen in Figure 1.

Spanning or bridging the gap 5, is a pin 6 preferably fixed in the bar D and loosely or slidably disposed in and through the bar 1 for retaining the bars 1 and D together in initially tensed relationship. At its inner end, the pin 6 is upset or provided with a button head, as at 7, for normally engaging the concave or inner face of the bar 1, while at its other or outer end, the pin 6 is provided with an offset head or socket-member 8 engaging the convex or outer face of the bar D and provided with a central recess 9.

E designates a gripping frame or clamp of approximately C-shape, which includes a handgrip or handle 10 provided at its opposite ends with registering laterally projecting legs 11, 12, the former of which is preferably formed with a notch 13 (Figure 2) for efficiently engaging the flange $a$ of a T-section shoe A. The other leg 12 of the frame E carries a boss 14, in which is threaded an elongated screw 15 shiftable for pressure applying purposes axially toward and from the leg 11. At its outer end, the screw 15 is provided for manipulative purposes with a laterally shiftable cross-bar or handle 16, and at its inner end, the screw 15 is reduced in diameter and thereby provided with a terminal pin or stem 17 adapted for detachable pressure applying engagement with the socket-recess 9.

In use and operation, the brake-shoe A is laid on its side on a work-bench or the like, and a suitable length of the lining B is laid loosely against the peripheral face of the shoe A. The frame C is now laid arcwise against the lining B, and the clamp E is fitted in place on the shoe A with its leg 11 engaging the shoe and the screw 15 engaging its stem 17 in the socket-member 8, as best seen in Figure 2, care being taken, of course, to substantially center the lining B and frame C on the shoe A.

The screw 15 being now manipulated for shifting the frame C towards the shoe A, the lining B is first generally flexed arcuately upon the shoe A. It will be found, however, that, while each nose 3 will engage the lining B with the periphery of the shoe A, almost always a gap, indicated at 18 in Figure 1, will exist between the lining B as so initially applied and the central part of the shoe A.

On further tightening of the screw 15, the frame C is expanded and forced down upon the brake-shoe A, the lining B being gripped or frictionally engaged between each nose 3 of the frame and the face of the shoe A. On continued tightening of the screw 15, the ends of the frame C yield for laterally shifting movement approximately parallel to the periphery of the shoe A, the noses 3 frictionally co-operating with the lining B for causing the opposite ends of the latter to follow with the ends of the frame C until the lining B is tightly stretched over the shoe A, the gap 18 being ultimately substantially closed or eliminated, as best seen in Figure 3.

For most efficient performance of its intended functions, the lining B must have a full, complete, and continuous engagement with the shoe A, that is, the lining B must be substantially free of air pockets, loose spots, wrinkles, twists, and the like, and, in passing, I may state that it is practically impossible, by merely stretching the lining B, to cause the same to snugly engage the periphery of the shoe A with a continuous and uninterrupted contact therebetween. Hence, as the ends of the frame C spread apart, the tension strap 2 is caused to descend upon the lining B, until finally the strap 2 snugly hugs the shoe A over the interposed lining-section B, when further lateral shifting of the ends of the frame C is restrained or prevented and the frame C loses its normally resilient or elastic qualities, in fact, the co-action of the strap 2 with the bar 1 is such as to more firmly grip or draw the ends 3 upon the lining B and the shoe A as pressure is applied upon the frame C (Figure 2.)

Hence, additional pressure applied through the now rigid frame C acts by means of the strap 2 for forcibly squeezing or pressing the lining B uniformly throughout its length firmly on the shoe A. The compression member or bar D also yields to the movement of the screw 15 for augmenting the pressure on the frame C, the pin 6 meanwhile shiftably sliding through the bar 1. The screw 15 may be tightened until the bar D resides flatwise against the bar 1, as best seen in Figure 3, the pressure applied on the lining B being thus substantially regulated suitably for accommodating different thicknesses or other like pressure-resisting qualities of the brake-lining material.

It is a common custom to attach or secure brake-lining to brake-shoes by means of suitable fastening elements or rivets engaging the lining and the shoe. For the reception of such rivets, the shoe A is suitably apertured as, for example, with end-holes 19 and intermediate holes 20.

In the practical employment of my new tool, the dimensions of the frame C are chosen such that its ends 3 will reside, when the frame C is compressed on the shoe A, somewhat away from or clear of the region of the end holes 19 of the shoe, in order to permit the drilling of rivet-receptive holes 21 in the lining in alignment with the end holes 19, and thereafter for facilitating the economical employment of a riveting mechanism, merely the driving head 22 and anvil 23 of which are shown in Figure 4, for driving suitable rivets 24 in the holes 21. Though not here specifically illustrated, it will be readily understood that the construction described enables also the convenient and economical employment of a suitable drilling mechanism (not shown) for drilling the apertures 21 in the lining B prior to the riveting operation.

During such drilling and riveting operations, the handle 10 most conveniently may be manually grasped, as shown at 25 in Figure 2, for the ready manipulation, as a unit, of the entire assembly of the shoe A, lining B, frames C, D, and gripping means E, to and from the several machines involved in the described operations.

And it is to be further noted that, during such several operations upon the lining and shoe, the hand of the operator, and the principal otherwise interfering parts of the tool, are quite remote from, and wholly out of interfering proximity to, the operative parts of the actuating machinery parts.

The several parts of the tool are extremely simple in construction and may hence be made correspondingly light in weight without sacrifice of strength and durability, which feature contributes to resulting economies in manufacture of the tool, prolongs the useful life of each of the several parts, and enhances the portability and manipulative ease generally of the tool in the hands of the workman.

In Figure 5 is illustrated one modified form of frame C', characterized solely in that the formerly separately provided members or bars 1 and D are here merged into a single solid cambered member or bar 1' thickened at its central portion and tapering in gradually reduced section towards its ends, as shown, the socket-member 8 having its pin (not shown) riveted solidly in the member 1'.

In the other modified form of the tool shown in Figure 6, the formerly provided member D is omitted, and the lengths of the compression member 1'' and tension strap 2'' are respectively reduced for employment of the frame C'' on smaller shoes than are suitable for the tool of Figure 1. In this instance, also, the socket member 8 is attached directly on the cambered member 1''. The use of the tools of Figures 5 and 6 being readily apparent, further description thereof will, to avoid repetition, be here omitted, although I may add that the tool in each of its forms, has been found to be exceedingly efficient in the performance of its intended functions.

It will be understood that other changes and modifications in the form, construction, arrangement, and combination of the several parts of the tool may be made and substituted for those herein shown and described without departing from the nature and principle of my invention.

Having thus described my invention, what I claim and desire to secure by Letters Patent is—

1. A brake-shoe lining assembling tool including a frame for lining stretching co-operation with the arcuate surface of a brake-shoe, the frame comprising a cambered compression member having ends yieldable co-operably with the periphery of the brake-shoe and an interposed lining-section and a flexible tension member connecting the ends of the compression member for co-operably with the shoe restraining the ends of the compression member from yieldable movement, and means for applying pressure on the frame.

2. In a brake-shoe lining assembling tool, an expandible frame including a cambered member having ends shiftable under pressure for movement approximately parallel with the periphery of a brake shoe and a flexible strap connecting the ends of the cambered member for engaging an interposed lining on the shoe, a second cambered member engaging the first cambered member, a socketed pin connecting said cambered members under initially tensed relationship, and means including a pressure applying member engageable with said socketed pin for pressing the frame on the lining and the shoe.

3. In a brake-shoe lining assembling-tool, a cambered resilient member having nose-ends for gripping-engagement with a brake-shoe and an interposed lining-section, and means for applying pressure upon said member intermediate its nose-ends for laterally shifting said nose-ends approximately parallel to the periphery of the shoe for stretching the lining thereon.

4. In a brake-shoe lining-assembling-tool, a frame comprising a cambered resilient compression-member and a flexible tension-member attached to the compression-member, the frame having nose-ends for gripping-engagement with a brake shoe and an interposed lining-section, and means for applying pressure upon said frame intermediate said nose-ends for both laterally shifting said nose-ends approximately parallel to the periphery of the shoe for stretching the lining thereon and causing the tension-member to hug the brake-shoe in lining pressing engagement therewith.

5. In a brake-shoe lining-assembling-tool, a frame comprising a cambered resilient compression-member and a flexible tension-member disposed longitudinally of the concave side, and having its ends fixed to the ends, of the compression-member, the frame at the connected ends of said members being adapted for gripping-engagement with a brake-shoe and an interposed lining section, and means for applying pressure upon said frame intermediate said ends for both laterally shifting said ends approximately parallel to the periphery of the shoe for stretching the lining thereon and causing the tension-member to hug the brake-shoe in lining pressing engagement therewith.

6. In a brake-shoe lining-assembling-tool, a frame comprising a cambered resilient compression-member and a flexible tension-member disposed longitudinally of the concave side, and fixed at its ends to the ends, of the compression-member, the tension-member being normally flexed arcuately inwardly of the concavity of the compression-member and the frame at the connected ends of said members being adapted for gripping-engagement with a brake-shoe and an interposed lining section and means for applying pressure upon said frame intermediate said ends for both laterally shifting said ends approximately parallel to the periphery of the shoe for stretching the lining thereon and causing the tension-member to hug the brake-shoe in lining pressing engagement therewith.

7. In a brake-shoe lining-assembling-tool, a frame comprising an expandible cambered compression-member and a tension-member in the form of a flexible strap disposed longitudinally of the concave side, and fixed at its ends to the ends, of the compression-member, the frame at the connected ends of said members being adapted for gripping engagement with a brake-shoe and an interposed lining and said strap being normally flexed inwardly of the concavity of the compression-member for spaced relation to said lining-section, and means for applying pressure upon said frame intermediate said ends for both laterally shifting said ends approximately parallel to the periphery of the shoe for stretching the lining thereon and causing the tension-member to hug the brake-shoe in lining pressing engagement therewith.

8. In a brake-shoe lining-assembling-tool, a frame comprising an expandible cambered compression-member and a tension-member in the form of a flexible strap disposed longitudinally of the concave side, and fixed at its ends to the ends, of the compression-member, the frame at the connected ends of said members being adapted for gripping engagement with a brake-shoe and an interposed lining and said strap being normally flexed inwardly of the concavity of the compression-member for spaced relation to said lining-section, and means including a rigid frame engageable with the shoe and a member having operative connection with, and shiftable relatively to, the rigid frame and the compression-member for expanding the compression-member for laterally shifting the frame-ends approximately parallel to the periphery of the shoe for stretching the lining thereon and causing said strap to flatwise hug the brake-shoe in lining pressing engagement therewith.

9. In a brake-shoe lining-assembling-tool, an expandible frame comprising a first resilient cambered compression-member, a second resilient cambered compression-member having connection for expansion with the first compression-member, and a tension-member in the form of a flexible strap disposed longitudinally of the concave side, and fixed at its ends to the ends, of the first compression-member, the frame at the connected ends of said strap and first compression-member being adapted for gripping engagement with a brake shoe and an interposed lining-section and said strap being normally flexed inwardly of the concavity of the first compression-member for spaced relation to said lining-section, and means including a rigid frame engageable with the shoe, a socket on the second compression member, and a screw engaging the rigid frame and said socket for expanding said compression-members for laterally shifting the frame-ends approximately parallel to the periphery of the shoe for stretching the lining thereon and causing said strap to flatwise hug the brake-shoe in lining pressing engagement therewith.

10. In a brake-shoe lining-assembling-tool, an expandible frame comprising a first spring-steel compression-member arcuate in contour, a second spring steel compression-member also arcuate in contour having connection for expansion with the first compression-member, and a tension-member in the form of a flexible steel ribbon disposed longitudinally of the concave side, and fixed at its ends to the ends, of the first compression-member, the first compression-member having a radius of curvature less than the radius of curvature of a co-operable brake-shoe and the second compression-member having a radius of curvature less than the radius of curvature, and spanning approximately half the length, of the first compression-member, the frame at the connected ends of said ribbon and the first compression-member being adapted for gripping engagement with said brake-shoe and an interposed lining, said ribbon being normally flexed inwardly of the concavity of the first compression-member for spaced relation to said lining-section, and means including a rigid frame engageable with the shoe, a socket on the second compression member, and a screw engaging on the rigid frame and said socket for expanding said compression-members for laterally shifting the frame-ends approximately parallel to the periphery of the shoe for stretching the lining thereon and causing said strap to flatwise hug the brake-shoe in lining pressing engagement therewith.

HARRY B. BARRETT.